United States Patent
Gordon et al.

(10) Patent No.: US 7,505,519 B2
(45) Date of Patent: *Mar. 17, 2009

(54) METHOD AND APPARATUS FOR COMPRESSING VIDEO SEQUENCES

(75) Inventors: Donald F. Gordon, Los Altos, CA (US); Sadik Bayrakeri, Foster City, CA (US); Joseph R. Wild, Santa Clara, CA (US); Jeremy S. Edmonds, Sunnyvale, CA (US); Edward A. Ludvig, Redwood City, CA (US); John P. Comito, Redwood City, CA (US); Eugene Gershtein, Redwood Shores, CA (US)

(73) Assignee: Comcast IP Holdings, I, LLC, Wilmington, DE (US)

( * ) Notice: Subject to any disclaimer, the term of this patent is extended or adjusted under 35 U.S.C. 154(b) by 961 days.

This patent is subject to a terminal disclaimer.

(21) Appl. No.: 10/655,410

(22) Filed: Sep. 4, 2003

(65) Prior Publication Data
US 2004/0047417 A1      Mar. 11, 2004

Related U.S. Application Data

(60) Division of application No. 09/384,394, filed on Aug. 27, 1999, now Pat. No. 6,621,870, and a continuation-in-part of application No. 09/293,535, filed on Apr. 15, 1999, now Pat. No. 6,584,153.

(60) Provisional application No. 60/129,598, filed on Apr. 15, 1999.

(51) Int. Cl.
*H04N 7/12*     (2006.01)
*G06F 3/00*     (2006.01)

(52) U.S. Cl. .................... 375/240.28; 725/39

(58) Field of Classification Search ............ 375/240.28, 375/240.12, 240.01; 348/423.1; 725/39, 725/41–44, 54, 28; 370/510, 487, 536; 382/232
See application file for complete search history.

(56) References Cited

U.S. PATENT DOCUMENTS

| | | | |
|---|---|---|---|
| 4,290,063 A | 9/1981 | Traster | 340/723 |
| 4,437,093 A | 3/1984 | Bradley | 340/726 |
| 4,496,976 A | 1/1985 | Swanson et al. | 358/147 |
| 4,520,356 A | 5/1985 | O'Keefe et al. | 340/750 |
| RE32,187 E | 6/1986 | Barda et al. | 340/706 |
| 4,600,921 A | 7/1986 | Thomas | 340/825.31 |
| 4,633,297 A | 12/1986 | Skerlos et al. | 358/22 |

(Continued)

FOREIGN PATENT DOCUMENTS

EP         0 838 958 A1    4/1998

(Continued)

*Primary Examiner*—Gims S Philippe
(74) *Attorney, Agent, or Firm*—Wall & Tong, LLP

(57) ABSTRACT

A method and apparatus for compressing a plurality of video sequences, where each sequence has information that is common with other video sequences. The invention ensemble encodes the video sequences into an MPEG compliant transport stream using less predicted frame information than separately encoding each video sequence. One illustrative application of the invention is efficiently encoding and transmitting a user interface such as a program guide, interactive program guide, electronic program guide, navigator and the like. The user interface is illustratively embodied in an interactive program guide (IPG).

10 Claims, 12 Drawing Sheets

U.S. PATENT DOCUMENTS

| | | | |
|---|---|---|---|
| 4,706,121 A | 11/1987 | Young | 358/142 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,550,576 A | 8/1996 | Klosterman | 348/6 |
| 5,552,837 A | 9/1996 | Mankovitz | 348/734 |
| 5,553,123 A | 9/1996 | Chan et al. | 379/102 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,592,551 A | 1/1997 | Lett et al. | 380/20 |
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,274 A | 4/1997 | Roop et al. | 348/461 |
| 5,619,383 A | 4/1997 | Ngai | 360/20 |
| 5,621,579 A | 4/1997 | Yuen | 386/121 |
| 5,630,119 A | 5/1997 | Aristides et al. | 395/601 |
| 5,644,354 A | 7/1997 | Thompson et al. | 348/13 |
| 5,659,367 A | 8/1997 | Yuen | 348/465 |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,701,383 A | 12/1997 | Russo et al. | 386/46 |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,751,282 A | 5/1998 | Girard et al. | 345/327 |
| 5,754,940 A | 5/1998 | Smith et al. | 455/5.1 |
| 5,757,416 A | 5/1998 | Birch et al. | 348/6 |
| 5,764,739 A | 6/1998 | Patton et al. | 379/106.03 |
| 5,771,064 A | 6/1998 | Lett | 348/10 |
| 5,790,198 A | 8/1998 | Roop et al. | 348/460 |
| 5,790,806 A | 8/1998 | Koperda | 395/200.82 |
| 5,801,753 A | 9/1998 | Eyer | 348/13 |
| 5,801,787 A | 9/1998 | Schein et al. | 348/569 |
| 5,805,204 A | 9/1998 | Thompson et al. | 348/13 |
| 5,808,608 A | 9/1998 | Young et al. | 345/327 |
| 5,809,204 A | 9/1998 | Young et al. | 386/83 |
| 5,812,205 A | 9/1998 | Milnes et al. | 348/460 |
| 5,822,324 A | 10/1998 | Kostresti et al. | 370/487 |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |
| 5,844,620 A | 12/1998 | Coleman | 348/461 |
| 5,850,218 A | 12/1998 | Lajoie et al. | 345/327 |
| 5,852,478 A | 12/1998 | Kwoh | 348/734 |
| 5,854,840 A | 12/1998 | Cannella, Jr. | 380/9 |
| 5,859,660 A | 1/1999 | Perkins et al. | 725/32 |
| 5,870,150 A | 2/1999 | Yuen | 348/553 |

| | | | |
|---|---|---|---|
| 5,870,474 A | 2/1999 | Wasilewski et al. | 380/21 |
| 5,880,768 A | 3/1999 | Lemmons | 348/1 |
| 5,915,068 A | 6/1999 | Levine | 386/83 |
| 5,917,830 A | 6/1999 | Chen et al. | 370/487 |
| 5,949,476 A | 9/1999 | Pocock et al. | 348/24 |
| 6,005,562 A | 12/1999 | Shiga et al. | 725/43 |
| 6,130,898 A | 10/2000 | Kostreski et al. | 725/87 |
| 6,414,970 B1 | 7/2002 | Negishi et al. | 370/510 |
| 6,415,437 B1 | 7/2002 | Ludvig et al. | 725/41 |
| 6,470,460 B1 | 10/2002 | Kashiwagi et al. | 713/501 |
| 6,651,252 B1 * | 11/2003 | Gordon et al. | 725/54 |
| 6,704,359 B1 * | 3/2004 | Bayrakeri et al. | 375/240.12 |
| 6,741,617 B2 * | 5/2004 | Rosengren et al. | 370/536 |
| 6,782,132 B1 * | 8/2004 | Fogg | 382/232 |
| 6,968,567 B1 * | 11/2005 | Gordon et al. | 725/54 |

FOREIGN PATENT DOCUMENTS

WO      94/14282      6/1994

* cited by examiner

METHOD AND APPARATUS FOR COMPRESSING VIDEO SEQUENCES

This application is a division of U.S. patent application Ser. No. 09/384,394, filed Aug. 27, 1999 now U.S. Pat. No. 6,621,870, which application claims benefit of U.S. Provisional Patent Application Ser. No. 60/129,598 filed Apr. 15, 1999; such prior applications are hereby incorporated herein by reference in its entirety.

U.S. patent application Ser. No. 09/384,394 is also a continuation-in-part of U.S. patent application Ser. No. 09/293,535 filed Apr. 15, 1999 now U.S. Pat. No. 6,584,153, which is hereby incorporated herein by reference in its entirety.

BACKGROUND OF THE DISCLOSURE

1. Field of the Invention

The invention relates to communications systems in general and, more specifically, the invention relates to a video compression technique suitable for use in an interactive multimedia information delivery system.

2. Description of the Background Art

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top boxes, or other methods of trying to offer service differentiated from standard cable and over the air broadcast systems.

With this increase in bandwidth, the number of programming choices has also increased. Leveraging off the availability of more intelligent set top boxes, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider.

The use of compression techniques to reduce the amount of data to be transmitted may increase the speed of transmitting program guide information. In several communications systems, the data to be transmitted is compressed so that the available transmission bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable rate digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

However, the MPEG-1 and MPEG-2 standards have, in some instances, very strict elementary stream and transport stream formats, causing usage of extra bandwidth for certain applications. For example, if a number of interactive program guide (IPG) pages were created as video sequences, only limited number of pages could be encoded into a transport stream(s) at a specified bandwidth.

Therefore, it is desirable to provide a video compression and decompression technique that enables an increased number of programs (video sequences) to be transmitted within an MPEG-2 transport stream(s).

SUMMARY OF THE INVENTION

The invention is a method and apparatus for compressing a plurality of video sequences, where each sequence has information common with other video sequences. Ideally, the invention ensemble encodes the video sequences such that the common information between the sequences is encoded into one stream and the non-common information is respectively encoded into separate streams. However, when using MPEG encoding to encode the sequences, some common information will appear in the stream primarily carrying the non-common information and some non-common information will appear in the stream primarily carrying the common information. For other forms of encoding, this cross contamination of common and non-common information may not occur.

In a practical embodiment of the invention, the invention ensemble encodes the MPEG-compliant video sequences into an MPEG-compliant transport stream using less predicted frame information than separately encoding each video sequence. The plurality of encoded elementary streams are processed to create one stream having only predicted frames (e.g., B and P frames) and other streams having the intra-coded frame (reference frame) of each stream. The stream containing the predicted frames represents (for the most part) the common information across all the sequences, while the streams containing the reference frames represent a combination of common and non-common information, illustratively the guide portion of an interactive program guide, that is different from sequence to sequence. The predicted frame stream is assigned a packet identifier (PID) code and the other streams are each assigned their own separate PIDs. All the streams are then assembled into a transport stream and transmitted to a receiver. The receiver reassembles any of the streams by concatenating a selected reference frame stream with the predicted frame stream. The stream is then decoded to form a video frame sequence for display.

One illustrative application for the inventive encoder is to efficiently encode and transmit a user interface screens such as a program guide, interactive program guide, electronic program guide, navigator and the like. The user interface is illustratively embodied in an interactive program guide (IPG). An IPG is defined in a page having a graphic grid of programming information and a video portion for displaying movie trailers, informative video, promotional video and the like. Audio also accompanies the video. Each page is represented by a video frame sequence and many pages can display a 24 hours period of available programming. Since the sequences are generally identical except for differing program grids in each sequence, each of the sequences are encoded as discussed above. As such, to decode a particular IPG page for display, a receiver need only select a PID for a specific page and the receiver will assemble the predicted stream with the selected reference frame to produce a stream for decoding. A decoder then produces the frame sequence for the selected IPG page. To change pages, the receiver selects another reference frame PID, attaches that stream to the predicted stream, and then produces a different IPG page. Since the frame sequences are similarly ensemble encoded in a synchronous manner, the transition from page to page is seamless.

The method of invention works with MPEG-1, MPEG-2, and any future derivatives of MPEG that are compliant with these first two versions. It is also important to note that the invention is equally applicable to any encoding system, including systems that does not utilize MPEG video and transport stream formats.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

This invention is a system for generating, distributing and receiving a stream containing compressed video information from a substantial number of video sequences. The invention is illustratively used to encode a plurality of interactive program guides that enable a user to interactively review, preview and select programming for a television system.

A. System

Figure 1:
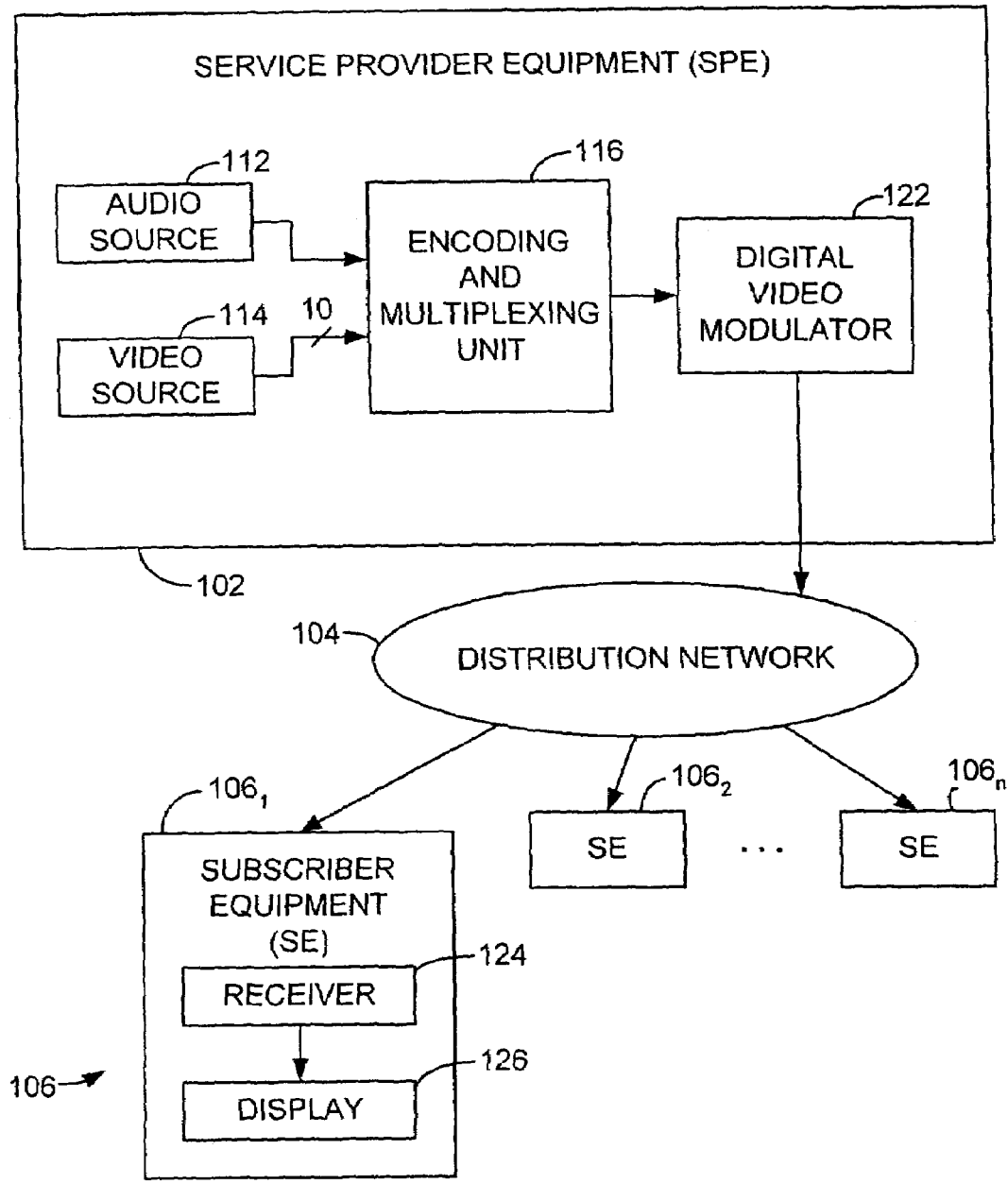
FIG. 1 depicts a block diagram of an illustrative interactive information distribution system that performs includes the encoding unit and process of the present invention.

FIG. 1 depicts a high-level block diagram of an information distribution system 100, e.g., a video-on-demand system or digital cable system, that incorporates the present invention. The system 100 contains service provider equipment (SPE) 102 (e.g., a head end), a distribution network 104 (e.g., hybrid fiber-coax network) and subscriber equipment (SE) 106. This form of information distribution system is disclosed in commonly assigned U.S. patent application Ser. No. 08/984,710 filed Dec. 3, 1997. The system is known as DIVA provided by DIVA Systems Corporation.

In general, the SPE 102 produces a plurality of digital streams that contain encoded information in MPEG compressed format. These streams are modulated using a modulation format that is compatible with the distribution network 104. The subscriber equipment 106, at each subscriber location $106_1$, $106_2$, ..., $106_n$, comprises a receiver 124 and a display 126. Upon receiving a stream, the subscriber equipment receiver 124 extracts the information from the received signal and decodes the stream to produce the information on the display, i.e., produce a television program, program guide page, or other multimedia program.

In an interactive information distribution system such as the one described in commonly assigned U.S. patent application Ser. No. 08/984,710, filed Dec. 3, 1997, the program streams are addressed to particular subscriber equipment locations that requested the information through an interactive menu. A related interactive menu structure for requesting video on demand is disclosed in commonly assigned U.S. patent application Ser. No. 08/984,427, filed Dec. 3, 1997. Another example of interactive menu for requesting multimedia services is the interactive program guide (IPG) disclosed in commonly assigned U.S. patent application 60/093,891, filed in Jul. 23, 1998.

To assist a subscriber (or other viewer) in selecting programming, the SPE 102 produces an interactive program guide that is compressed for transmission in accordance with the present invention. The IPG contains program information, e.g., title, time, channel, program duration and the like, as well at least one region displaying full motion video, i.e., a television advertisement or promotion. Such informational video is provided in various locations within the program guide screen.

The invention produces the IPG using a compositing technique that is described in commonly assigned U.S. Pat. No. 6,415,437, issued Jul. 2, 2002, and U.S. patent application Ser. No. 09/359,561, filed Jul. 23, 1999, which are hereby incorporated by reference herein. The compositing technique, which will not be discussed further herein, enables full motion video to be positioned within an IPG and have the video seamlessly transition from one IPG page to another. The composited IPG pages (i.e., a plurality of video frame sequences) are coupled from a video source 114 to an encoding and multiplexing unit 116 of the present invention. Audio signals associated with the video sequences are supplied by an audio source 112 to the encoding and multiplexing unit 116.

The encoding and multiplexing unit 116 compresses the frame sequences into a plurality of elementary streams. The elementary streams are further processed to remove redundant predicted frames. A multiplexer within unit 116 then assembles the elementary streams into a transport stream.

The transport stream is then modulated by the digital video modulator 122 using a modulation format that is compatible with the distribution network 104. For example, in the DIVA™ system the modulation is quadrature amplitude modulation (QAM); however, other modulation formats could be used.

The subscriber equipment 106 contains a receiver 124 and a display 126 (e.g., a television). The receiver 124 demodulates the signals carried by the distribution network 104 and decodes the demodulated signals to extract the IPG pages from the stream. The details of the receiver 124 are described below with respect to FIG. 5.

B. Encoding and Multiplexing Unit 116

Figure 2:
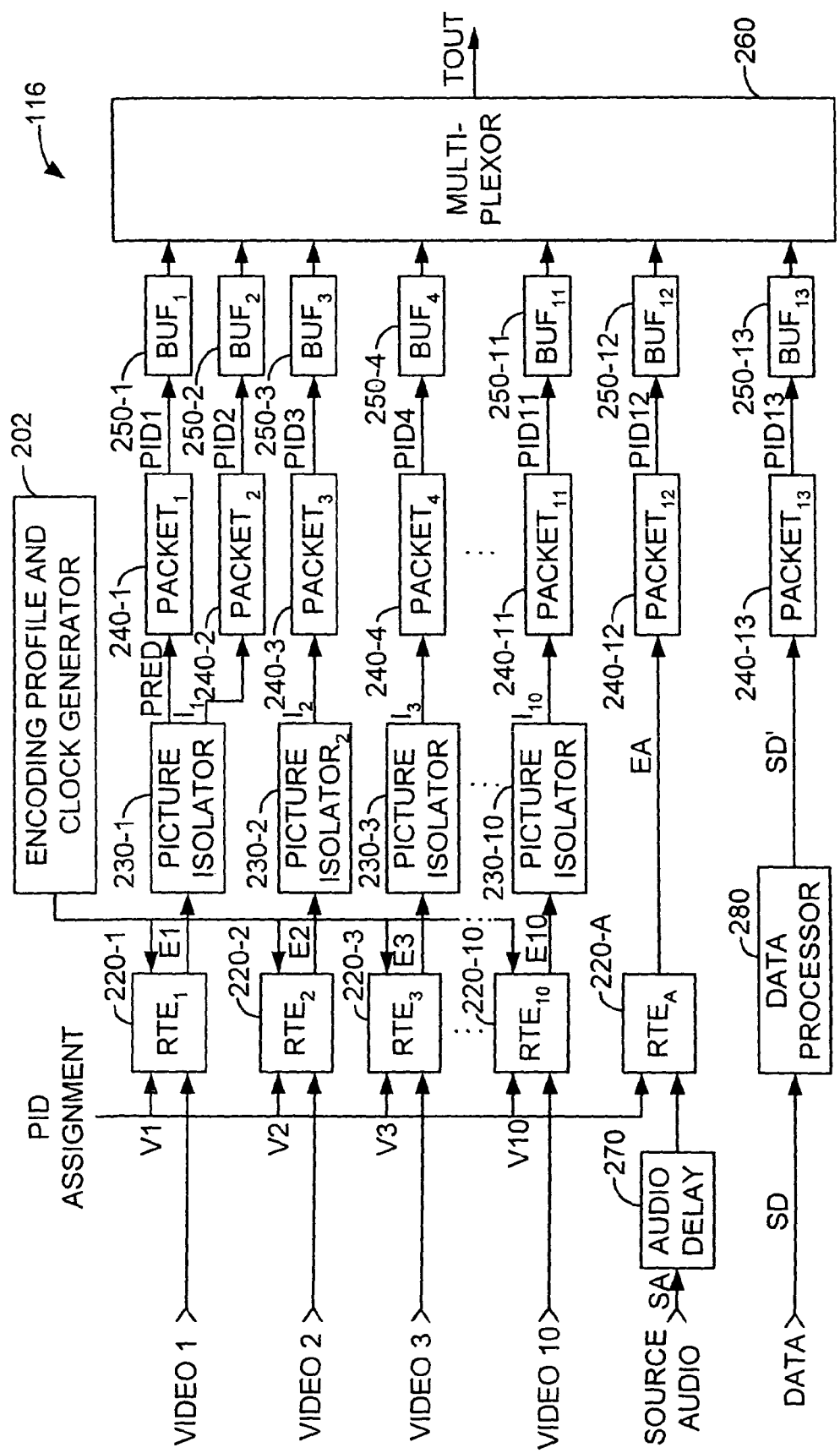
FIG. 2 depicts a block diagram of an encoding and multiplexing unit in accordance with the present invention.

FIG. 2 depicts a block diagram of the encoding and multiplexing unit 116 of FIG. 1 which produces a transport stream comprising a plurality of encoded video, audio, and data elementary streams. The invented system is designed specifically to work in an ensemble encoding environment, where a plurality of video streams are generated to compress video information that carries common and non-common content. Ideally, the common content is encoded into a single elementary stream and the non-common content are encoded into separate elementary streams. However, in a practical MPEG encoding process, some common information will appear in the stream intended to carry non-common information and some non-common information will appear in the stream intended to carry common information. In this way, the common content is not duplicated in every stream, yielding significant bandwidth savings. Although the following description of the invention is presented within the context of IPG, it is important to note that the method and apparatus of the invention is equally applicable to a broad range of applications, such as broadcast video on demand delivery, e-commerce, internet video education services, and the like, where delivery of video sequences with command content is required.

Specifically, the encoding and multiplexing unit 116 receives a plurality of video sequences V1-V10 and, optionally, one or both of a audio signal SA and a data signal SD.

The video sequences V1-V10 includes imagery common to each other, e.g., common IPG background information and common video portion information. On the other hand, the programming information (program grid graphic) is different in every sequence V1-V10.

The audio source SA comprises, illustratively, audio information that is associated with a video portion in the video sequences such as an audio track associated with still or moving images. For example, in the case of video sequence V1 representing a movie trailer, the audio stream SA is derived from the source audio (e.g., music and voice-over) associated with the music trailer.

The data stream SD comprises, illustratively, overlay graphics information, textual information describing programming indicated by the guide region and other system or user interface related data. The data stream SD can be separately encoded into its own elementary stream or included within the MPEG-2 or other suitable standard or proprietary transport stream suitable for use in the information distribution system of FIG. 1. as private data, auxiliary data, and the like.

The encoding and multiplexing unit 116 comprises a plurality of real time MPEG-2 encoders 220-1 through 220-10 (collectively encoders 220), an encoding profile and clock generator 202, a plurality of picture isolators 230-1 through 230-10 (collectively picture isolators 230), a plurality of packetizers 240-1 through 240-13 (collectively packetizers 240), a plurality of buffers 250-1 through 250-13 (collectively buffers 250), a transport multiplexer 260, an audio delay element 270 and an optional data processor 280.

The video sequences V1-V10 are coupled to respective real time encoders 220. Each encoder 220 encodes, illustratively, a composited IPG screen sequence to form a corresponding compressed video bit stream, e.g., an MPEG-2 compliant bit stream having associated with it a predefined group of pictures (GOP) structure. A common clock and encoding profile generator 202 provides a clock and profile to each encoder 220 to ensure that the encoding timing and encoding process occur similarly for each video sequence V1-V10. As such, the encoding is performed in a synchronous manner.

For purposes of this discussion, it is assumed that the GOP structure consists of an I-picture followed by ten B-pictures, where a P-picture separates each group of two B-pictures (i.e., "I-B-B-P-B-B-P-B-B-P-B-B-P-B-B"), however, any GOP structure and size may be used in different configurations and applications. It is preferable that the same encoding profile, including the GOP structure, is used by each of the real time encoders 220 to have uniform encoding across multiple streams and to produce approximately the same size encoded I- and Predicted-Pictures. Moreover, by utilizing the same profile and predefined GOP structure, multiple instances of the same encoder are used to realize the encoding and multiplexing unit 116, thereby driving down costs. Note also that the encoding process can be performed by one encoder or a plurality of encoders depending on implementation choice.

Each of the real time encoders 220 produces an encoded MPEG-2 bit stream (E1-E10) that is coupled to a respective picture isolator 230. Each of the picture isolators 230 examines the encoded video stream to isolate I-pictures within the MPEG-2 compliant streams E1-E10, by analyzing the stream access units associated with I-, P- and B-pictures.

The first picture isolator 230-1 receives the MPEG-2 compliant stream E1 from the first real time encoder 220-1 and responsively produces two output bit streams PRED and $I_1$. The remaining picture isolators 230-2 to 230-10 produces only I frame streams. Note that the PRED stream can be generated by any one of the picture isolators.

The picture isolators 230 process the received streams E1-E10 according to the type of picture (I-, P- or B-picture) associated with a particular access unit and also the relative position of the pictures within the sequence and group of pictures. As noted in the MPEG-1 and MPEG-2 specifications, an access unit comprises a coded representation of a presentation unit. In the case of audio, an access unit is the coded representation of an audio frame. In the case of video, an access unit includes all the coded data for a picture and any stuffing bits that follows it, up to but not including the start of the next access unit. If a picture is not preceded by a group start code or a sequence header code, then the corresponding access unit begins with the picture start code. If the picture is preceded by a group start code and/or a sequence header code (e.g., an I-picture), then the corresponding access unit begins with the first byte of the first start code in the sequence or a GOP. If the picture is the last picture preceding a sequence end code in the stream, then all bytes between the last byte of the coded picture and the sequence end code (including the sequence end code) belong to the access unit. Each of the remaining B- and P-picture access units in a GOP includes a picture start code. The last access unit of the GOP (e.g., a terminating B-picture) includes, in addition, a sequence end code indicating the termination of the GOP.

The $I_1$ stream, as the first picture of the sequence, consists of a sequence header, a sequence extension, GOP header, picture header, picture extension, and I-picture data until the next picture start code. By contrast, the PRED stream comprises only P- and B-picture access units, starting from the second picture start code (illustratively a B-picture) and all data until the next group start code, thereby including all access units of the GOP except those representing the I-picture.

Each of the second 230-2 through tenth 230-10 picture isolators receive, respectively, the MPEG-2 compliant streams E2 through E10 from the corresponding real time encoders 220-2 through 220-10, each producing one respective output stream $I_1$-$I_{10}$ comprising only the sequence header and all data until the respective second picture start codes (i.e., the access unit data associated with an I-picture at the beginning of the respective GOP).

Figure 3:
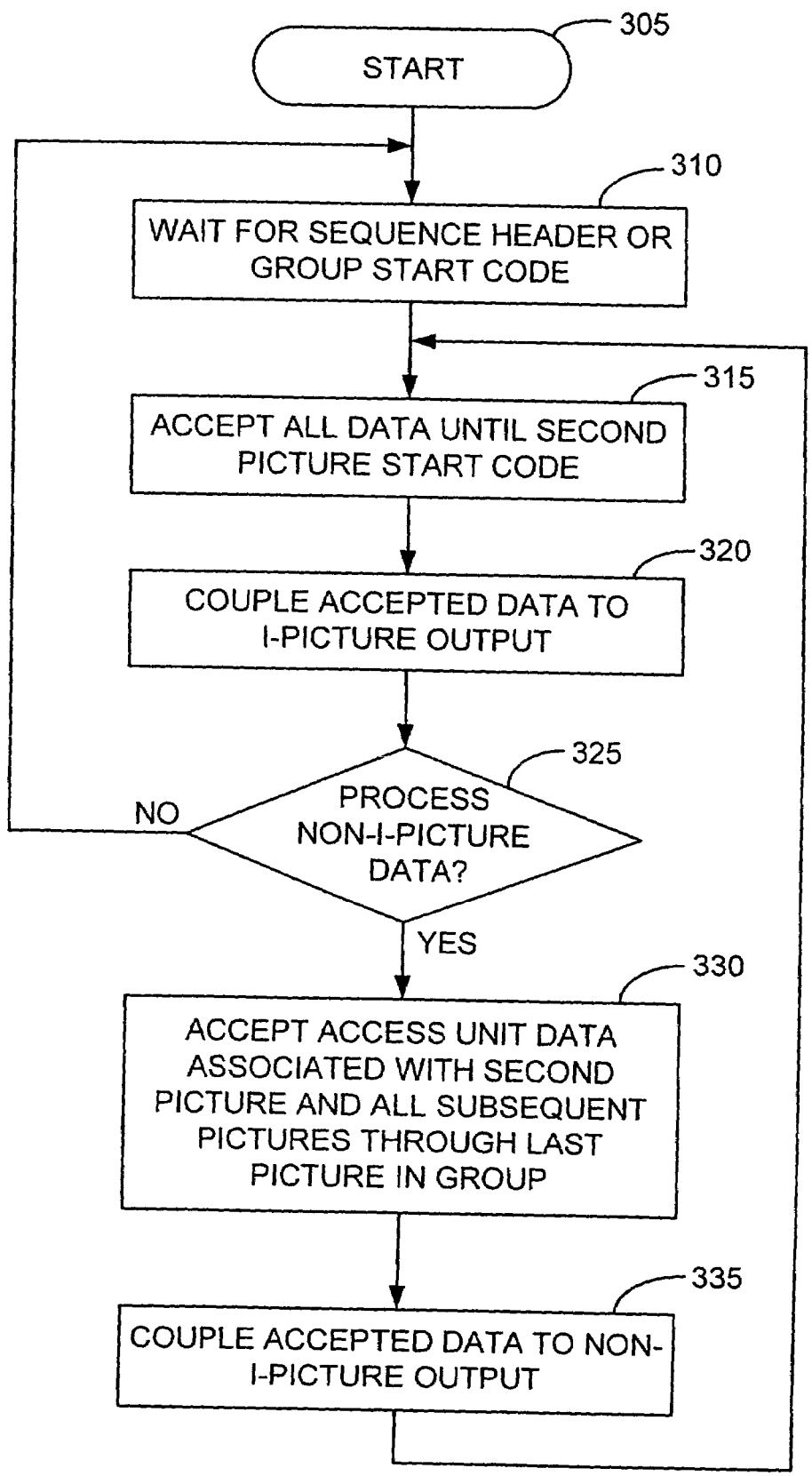
FIG. 3 is a flow diagram of a process used by a picture isolator.

FIG. 3 illustrates a high-level flow sequence in isolating pictures suitable for use in the picture isolators unit 230 of FIG. 2.

The picture isolator method 300 is entered at step 305 and proceeds to step 310, where it waits for a sequence header or a group start code, upon detection of which it proceeds to step 315.

At step 315, the sequence header and all data until the second picture start code is accepted. The method 300 then proceeds to step 320.

At step 320, the accepted data is coupled to the I-picture output of the picture isolator. In the case of picture isolators 230-2 through 230-10, since there is no PB output shown, the accepted data (i.e., the sequence header, I-picture start code and I-picture) is coupled to a sole output. The method 400 then proceeds to step 325.

At step 325, a query is made as to whether non-I-picture data is to be processed. That is, a query is made as to whether non-I-picture data is to be discarded or coupled to a packetizer. If the query at step 325 is answered negatively (non-I-picture data is discarded) then the method 300 proceeds to step 310 to wait for the next sequence header. If the query at step 325 is answered affirmatively, then the method 300 proceeds to step 330.

At step 330, the second picture start code and all data in a GOP until the next group start code is accepted. The method 400 then proceeds to step 335.

At step 335, the accepted data is coupled to the non-I-picture output of the frame isolator 230 to form the PRED stream.

In summary, the picture isolator method 300 examines the compressed video stream produced by the real time encoder 220 to identify the start of a GOP, the start of an I-picture (first picture start code after the group start code) and the start of predicted-pictures (second picture start code after the group start code) forming the remainder of a GOP. The picture isolator method couples the I-pictures and predicted-pictures to packetizers for further processing in conformance with the invention.

The first packetizer 240-1 packetizes the PRED stream into a plurality of fixed length transport packets according to, e.g., the MPEG-2 standard. Additionally, the first packetizer 240-1 assigns a packet identification (PID) of, illustratively, one (1) to each of the packets representing information from the PRED stream, thereby producing a packetized stream PID-1. The second packetizer 240-2 packetizes the I stream to produce a corresponding packetized stream PID-2.

The $I_2$ through $I_{10}$ output streams of the second 230-2 through tenth 230-10 picture isolators are coupled to, respectively, third 240-3 through eleventh 240-11 transport packetizers, which produce respective packetized streams PID-3-PID-11.

In addition to the video information forming the ten IPG screens, audio information associated with IPG screens is encoded and supplied to the transport multiplexer 260. Specifically, the source audio signal is subjected to an audio delay 270 and then encoded by a real time audio encoder 220-A, illustratively a Dolby AC-3 real time encoder, to produce an encoded audio stream EA. The encoded stream EA is packetized by a 12th transport packetizer 240-12 to produce a transport stream having a PID of 12(PID-12). The PID-12 transport stream is coupled to a $12^{th}$ buffer 250-12.

The IPG grid foreground and overlay graphics data is coupled to the transport multiplexer 260 as a data stream having a PID of thirteen (PID-13). The data stream is produced by processing the data signal SD as related for the application using the data processor 280 and packetizing the processed data stream SD' using the thirteenth packetizer 240-13 to produce the PID-13 signal, which is coupled to the thirteenth buffer 250-13.

Each of the transport packetized streams PID-1-PID-11 is coupled to a respective buffer 250-1 through 250-11, which is in turn coupled to a respective input of the multiplexer 260, illustratively an MPEG-2 transport multiplexer. While any type of multiplexer will suffice to practice the invention, the operation of the invention is described within the context of an MPEG-2 transport multiplexing system.

A transport stream, as defined in ISO standard 13818-1 (commonly known as MPEG-2 systems specification), is a sequence of equal sized packets, each 188 bytes in length. Each packet has a 4 bytes of header and 184 bytes of data. The header contains a number of fields, including a PID field. The PID field contains thirteen bits and uniquely identifies each packet that contains a portion of a "stream" of video information as well as audio information and data. As such, to decode a particular video stream (or audio or data stream) for viewing or presentation, the decoder in the subscriber or user equipment extracts packets containing a particular PID and decodes those packets to create the video (or audio or data) for viewing or presenting.

Each of the thirteen streams representing the IPG is uniquely identified by a PID. In the preferred embodiment, the thirteen streams are multiplexed into a single transport stream. Less or more IPG streams may be included in the transport stream as bandwidth permits. Additionally, more than one transport stream can be used to transmit the IPG streams.

Multiplexer 260 processes the packetized data stored in each of the 13 buffers 250-1 through 250-13 in a round robin basis, beginning with the $13^{th}$ buffer 250-13 and concluding with the first buffer 250-1. That is, the transport multiplexer 260 retrieves or "drains" the PID 13 information stored within the $13^{th}$ buffer 250-13 and couples that information to the output stream TOUT. Next, the $12^{th}$ buffer 250-12 is emptied of packetized data which is then coupled to the output stream TOUT. Next, the $11^{th}$ buffer 250-11 is emptied of packetized data which is then coupled to the output stream TOUT and so on until the $1^{st}$ buffer 250-1 is emptied of packetized data which is then coupled to the output stream TOUT. It is important to note that the processing flow is synchronized such that each output buffer includes all the access units associated with an I-picture (250-2 through 250-11) suitable for referencing a GOP, a particular group of P- and B-pictures (250-1) suitable for filling out the rest of the GOP, a particular one or more audio access units (250-12) and a related amount of data (250-13). The round robin draining process is repeated for each buffer, which has been filled in the interim by new transport packetized streams PID-13 to PID-1.

Figure 4:
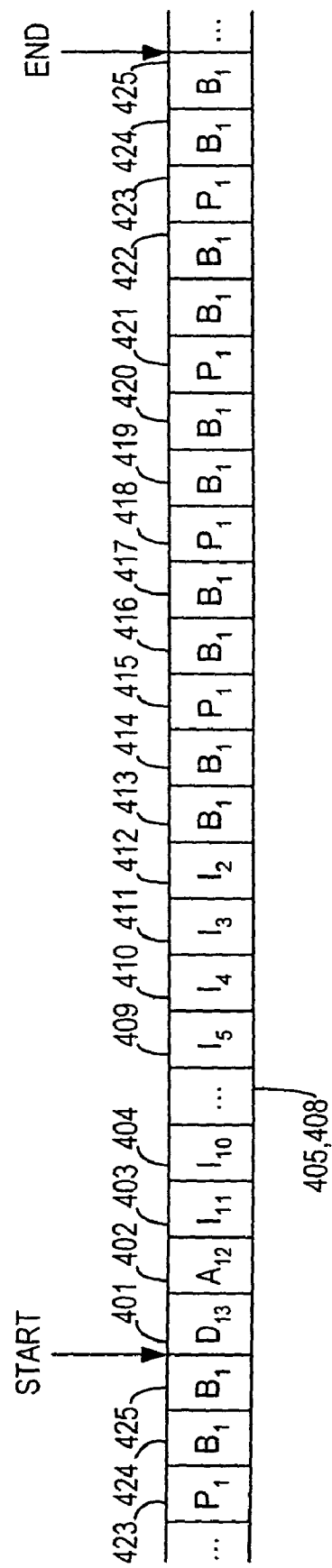
FIG. 4 depicts a data structure of a transport stream that is generated in accordance with the present invention.

FIG. 4 depicts a data structure 400 for a transport stream produced by the encoding and multiplexing unit as a result of processing in a round robin basis. The figure shows one GOP portion of a transport stream, which is indicated by "START" and "END" phrases. The data structure starts with data transport packet 401 having PID-13, then it proceeds with an audio packet 402 having PID-12, which are followed by I-picture packets 403-412 assigned as PID-11 to PID-2. The remaining packets 413 to 425 carry the PRED stream with PID-1. The packets 423 to 425 in the figure show the terminating access units of the previous GOP.

Note that the exemplary data structure and the round robin process are not strictly required for the operation of the invention. The data and audio packets can be placed into different parts of the transport stream, or the sequence of I-picture packets can be changed in a different data structure. The only requirement is that the I-picture related packets should precede the PRED stream in the transport stream if the set top terminal is to decode the stream in one pass without storing any packets. This only requirement, which comes from necessity of decoding the reference I-pictures before the predicted pictures, is removed for set top terminals with additional storage capabilities.

In the preferred embodiment, the exemplary data structure (and related other varied embodiments that still incorporate the above teachings) is encapsulated in one multi-program transport stream. Each program in the program map table (PMT) of MPEG-2 transport stream includes an I-PID (one of the illustrative ten I-PID's 403 to 412), the PRED stream PID-1, data PID-13 401, and audio PID-12 402. Although the multiplexer 260 of FIG.-2 couples a PRED stream access units 413-425 to the multiplexer output TOUT only once per GOP, the PMT for each program references PRED stream PID-1. For the illustrative organization of video input sources in FIG. 2, there would be ten programs, each consisting of one of ten I-PID's 403 to 413, PRED PID-1, audio PID-12, and data PID-13.

In an alternative embodiment, the information packets are formed into a single program and carried with a single program transport stream. In this embodiment, the complete set of PID's 401 to 425 are coupled into a single program.

Yet, in an alternative embodiment, multiple transport streams are employed to transport the data structure (and related other varied embodiments that still incorporate the above teachings) of FIG. 4. In this embodiment, each transport stream is formed in a multi-program manner, where each program comprises an I-PID, PRED-PID, data-PID and an audio PID. The information packets in each transport stream are retrieved in a similar way as a single transport stream. In still an alternative embodiment, the information packets are carried in single program multiple transport streams.

It is important to note that a variety of transport stream formats can be employed to carry the information streams generated by this invention, yet still being retrieved by a receiver that incorporates the teachings introduced in this invention. The resolution of PID's in a program that comprises multiple PID's and then recombination of I- and PRED-PID's require particular attention at the receiver terminal. The related teachings of the receiver recombination techniques are provided in the following sections.

C. Receiver 124

Figure 5:
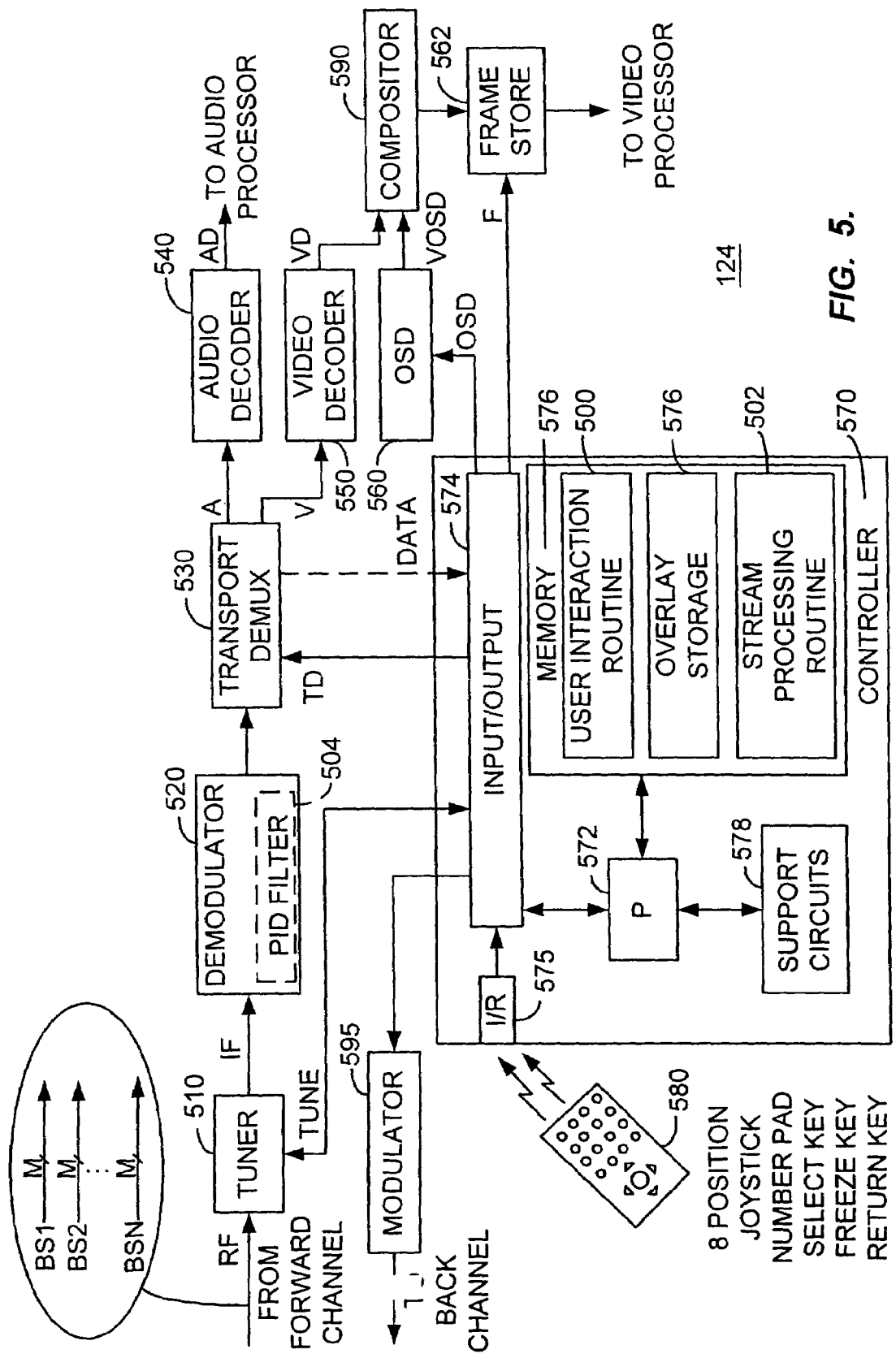
FIG. 5 depicts a block diagram of a receiver within subscriber equipment suitable for use in an interactive information distribution system.

FIG. 5 depicts a block diagram of the receiver 124 (also known as a set top terminal (STT) or user terminal) suitable for use in producing a display of a user interface in accordance with the present invention. The STT 124 comprises a tuner 510, a demodulator 520, a transport demultiplexer 530, an audio decoder 540, a video decoder 550, an on-screen display processor (OSD) 560, a frame store memory 562, a video compositor 590 and a controller 570. User interaction is provided via a remote control unit 580. Tuner 510 receives, e.g., a radio frequency (RF) signal comprising, for example, a plurality of quadrature amplitude modulated (QAM) information signals from a downstream (forward) channel. Tuner 510, in response to a control signal TUNE, tunes a particular one of the QAM information signals to produce an intermediate frequency (IF) information signal. Demodulator 520 receives and demodulates the intermediate frequency QAM information signal to produce an information stream, illustratively an MPEG transport stream. The MPEG transport stream is coupled to a transport stream demultiplexer 530.

Transport stream demultiplexer 530, in response to a control signal TD produced by controller 570, demultiplexes (i.e., extracts) an audio information stream A and a video information stream V. The audio information stream A is coupled to audio decoder 540, which decodes the audio information stream and presents the decoded audio information stream to an audio processor (not shown) for subsequent presentation. The video stream V is coupled to the video decoder 550, which decodes the compressed video stream V to produce an uncompressed video stream VD that is coupled to the video compositor 590. OSD 560, in response to a control signal OSD produced by controller 570, produces a graphical overlay signal VOSD that is coupled to the video compositor 590. During transitions between streams representing the user interfaces, buffers in the decoder are not reset. As such, the user interfaces seamlessly transition from one screen to another.

The video compositor 590 merges the graphical overlay signal VOSD and the uncompressed video stream VD to produce a modified video stream (i.e., the underlying video images with the graphical overlay) that is coupled to the frame store unit 562. The frame store unit 562 stores the modified video stream on a frame-by-frame basis according to the frame rate of the video stream. Frame store unit 562 provides the stored video frames to a video processor (not shown) for subsequent processing and presentation on a display device.

Controller 570 comprises a microprocessor 572, an input/output module 574, a memory 576, an infrared (IR) receiver 575 and support circuitry 578. The microprocessor 572 cooperates with conventional support circuitry 578 such as power supplies, clock circuits, cache memory and the like as well as circuits that assist in executing the software routines that are stored in memory 576. The controller 570 also contains input/output circuitry 574 that forms an interface between the controller 570 and the tuner 510, the transport demultiplexer 530, the onscreen display unit 560, the back channel modulator 595, and the remote control unit 580. Although the controller 570 is depicted as a general purpose computer that is programmed to perform specific interactive program guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 5, the remote control unit 580 comprises an 8-position joy stick, a numeric pad, a "select" key, a "freeze" key and a "return" key. User manipulations of the joy stick or keys of the remote control device are transmitted to a controller via an infra red (IR) link. The controller 570 is responsive to such user manipulations and executes related user interaction routines 500, uses particular overlays that are available in an overlay storage 376.

Once received, the video streams are recombined via stream processing routine 502 to form the video sequences that were originally compressed. The following describes three illustrative methods for recombining the streams.

C1. Recombination Method 1

In this method, an I-Picture stream and the PRED stream to be recombined keep their separate PID's until the point where they must be depacketized. The recombination process is conducted within the demultiplexer 530 of the subscriber equipment 106. For illustrative purposes, assuming the preferred embodiment of the transport stream discussed above (multi-program transport stream with each program consisting of an I-PID, PRED-PID, audio-PID, and data-PID), any packet with a PID that matches any of the PID's within the desired program are depacketized and the payload is sent to the elementary stream video decoder. Payloads are sent to the decoder in exactly in the order in which the packets arrive at the demultiplexer.

Figure 6:
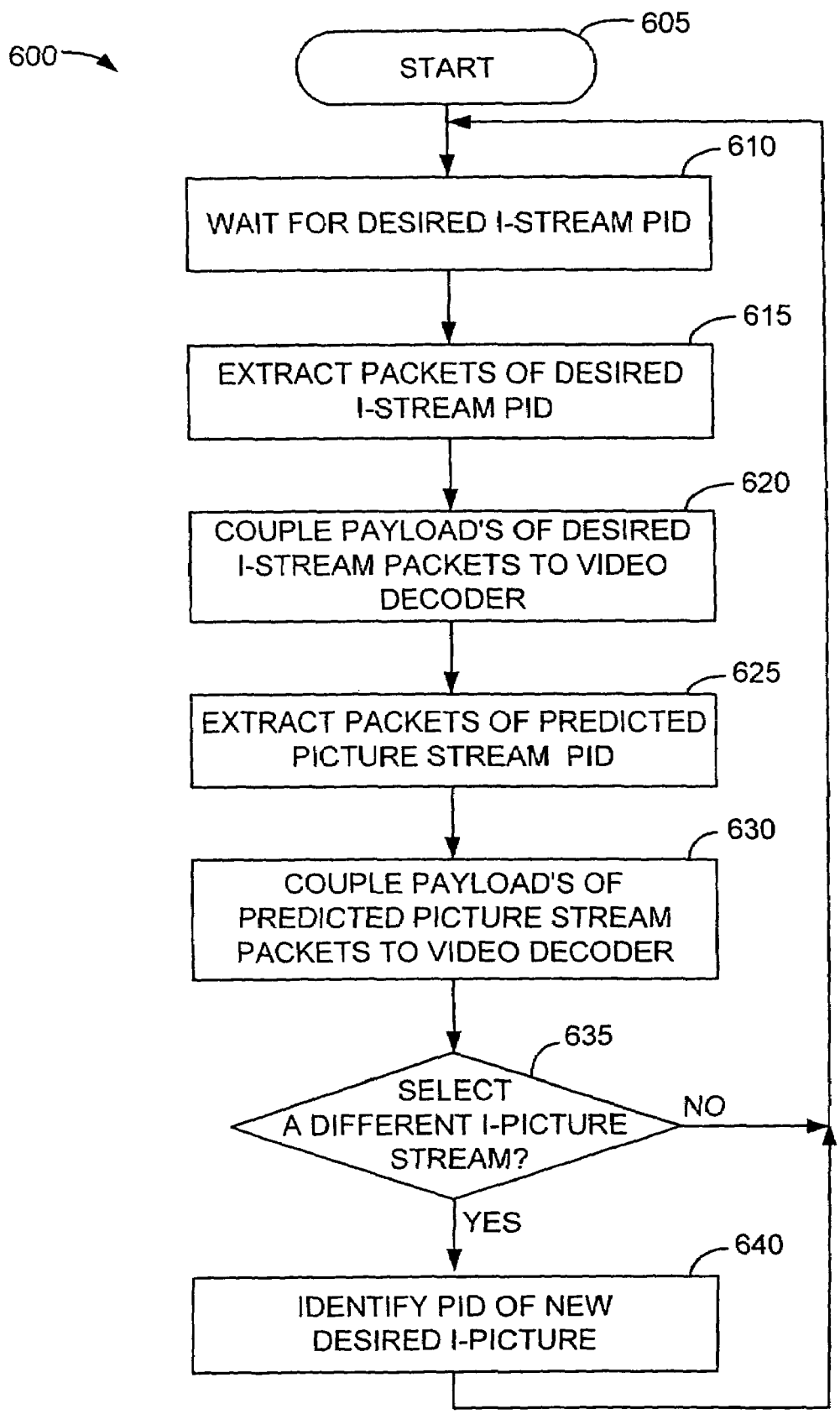
FIG. 6 depicts a flow diagram of a method for recombining and decoding streams.

FIG. 6 illustrates the details of this method, in which, it starts at step 605 and proceeds to step 610 to wait for (user) selection of an I-PID to be received. The I-PID, as the first picture of a stream's GOP, represents the stream to be received. Upon detecting a transport packet having the selected I-PID, the method 600 proceeds to step 615.

At step 615, the I-PID packets are extracted from the transport stream, including the header information and data, until the next picture start code. The header information within the first-received I-PID access unit includes sequence header, sequence extension, group start code, GOP header, picture header, and picture extension, which are known to a reader that is skilled in MPEG-1 and MPEG-2 compression standards. The header information in the next I-PID access units that belongs to the second and later GOP's includes group start code, picture start code, picture header, and extension. The method 600 then proceeds to step 620 where the payloads of the packets that includes header information related to video stream and I-picture data are coupled to the video decoder 550 as video information stream V. The method 600 then proceeds to step 625.

At step 625, the predicted picture packets PRED-PID, illustratively the PID-1 packets of fourteen predicted pictures 413 to 425 in FIG. 4 in a GOP of size fifteen, are extracted from the transport stream. At step 630, the payloads of the packets that includes header information related to video stream and predicted-picture data are coupled to the video decoder 550 as video information stream V. At the end of step 630, a complete GOP, including the I-picture and the predicted-pictures, are available to the video decoder 550. As the payloads are sent to the decoder in exactly in the order in which the packets arrive at the demultiplexer, the video decoder decodes the recombined stream with no additional recombination process. The method 600 then proceeds to step 635.

At step 635 a query is made as to whether a different I-PID is requested. If the query at step 635 is answered negatively, then the method 600 proceeds to step 610 where the transport demultiplexer 530 waits for the next packets having the PID of the desired I-picture. If the query at step 635 is answered affirmatively, then the PID of the new desired I-picture is identified at step 640 and the method 600 returns to step 610.

The method 600 of FIG. 6 is used to produce a conformant MPEG video stream V by concatenating a desired I-picture and a plurality of P- and/or B-pictures forming a pre-defined GOP structure.

C2. Recombination Method 2

The second method of recombining the video stream involves the modification of the transport stream using a PID filter. A PID filter 504 can be implemented as part of the demodulator 520 of FIG. 5.

For illustrative purposes, assuming the preferred embodiment of the transport stream discussed above (multi-program transport stream with each program consisting of an I-PID, PRED-PID, audio-PID, and data-PID), any packet with a PID that matches any of the PID's within the desired program to be received have its PID modified to the lowest video PID in the program (the PID which is referenced first in the program's program mapping table (PMT)). For example, in a program, assuming that an I-PID is 50, and PRED-PID is 51. Then, the PID-filter modifies the PRED-PID as 50 and thereby, both I- and Predicted-Picture access units attain the same PID number and become a portion of a common stream.

As a result, the transport stream output from the PID filter contains a program with a single video stream, whose packets appear in the proper order to be decoded as valid MPEG video.

Note that the incoming bit stream does not necessarily contain any packets with a PID equal to the lowest video PID referenced in the programs PMT. Also note that it is possible to modify the video PID's to other PID numbers than lowest PID without changing the operation of the algorithm.

When the PID's of incoming packets are modified to match the PID's of other packets in the transport stream, the continuity counters of the merged PID's may become invalid at the merge points, due to each PID having its own continuity counter. For this reason, the discontinuity indicator in the adaptation field is set for any packets that may immediately follow a merge point. Any decoder components that check the continuity counter for continuity is required to correctly process the discontinuity indicator bit.

Figure 7:
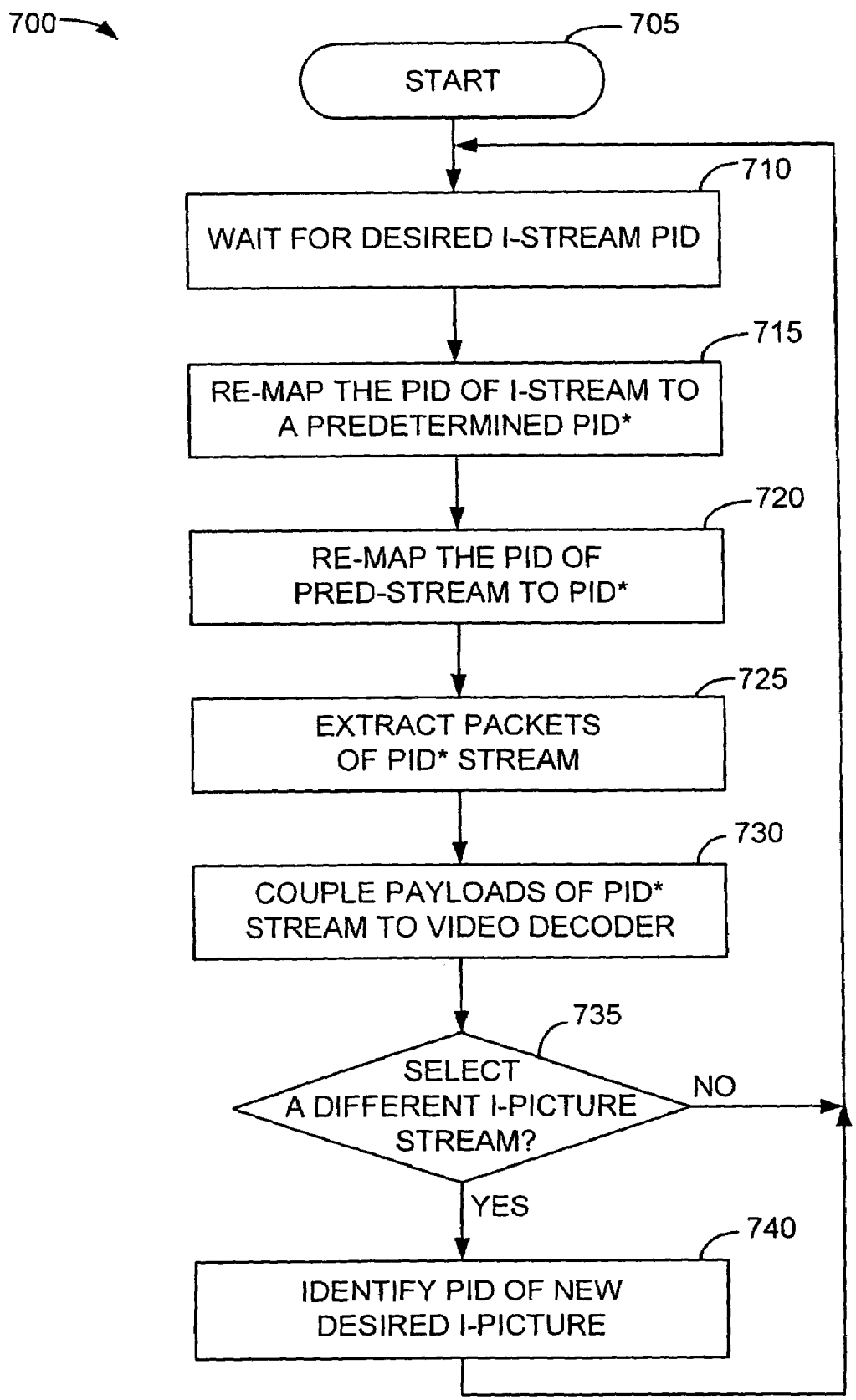
FIG. 7 depicts a flow diagram of a second method for recombining and decoding streams.

FIG. 7 illustrates the details of this method, in which, it starts at step 705 and proceeds to step 710 to wait for (user) selection of an I-PID to be received. The I-PID, as the first picture of a stream's GOP, represents the stream to be received. Upon detecting a transport packet having the selected I-PID, the method 700 proceeds to step 715.

At step 715, the PID number of I-stream is re-mapped to a predetermined number, PID*. At this step, the PID filter modifies all the PID's of the desired I-stream packets to PID*. The method then proceeds to step 720, wherein the PID number of the predicted picture stream, PRED-PID, is re-mapped to PID*. At this step, the PID filter modifies all the PID's of the PRED-PID packets to PID*. The method 700 then proceeds to step 725.

At step 725, the packets of the PID* stream is extracted from the transport stream by the demultiplexer. The method 700 then proceeds to step 730, where the payloads of the packets that includes video stream header information and I-picture and predicted picture data are coupled to the video decoder 550 as video information stream V. The method 700 then proceeds to step 735.

At step 735, a query is made as to whether a different I-PID is requested. If the query at step 735 is answered negatively, then the method 700 proceeds to step 710 where the transport demultiplexer 530 waits for the next packets having the PID of the desired I-picture. If the query at step 735 is answered affirmatively, then the PID of the new desired I-picture is identified at step 740 and the method 700 returns to step 710.

The method 700 of FIG. 7 is used to produce a conformant MPEG video stream V by merging the reference stream information and predicted stream information before the demultiplexing process.

C3. Recombination Method 3

The third method accomplishes MPEG bit stream recombination by using splicing information in the adaptation field of the transport packet headers by switching between video PIDs based on splice countdown concept.

In this method, the MPEG streams signal the PID to PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive the other video PID. Note that a special attention to splicing syntax is required in systems where splicing is used also for other purposes.

Figure 8:
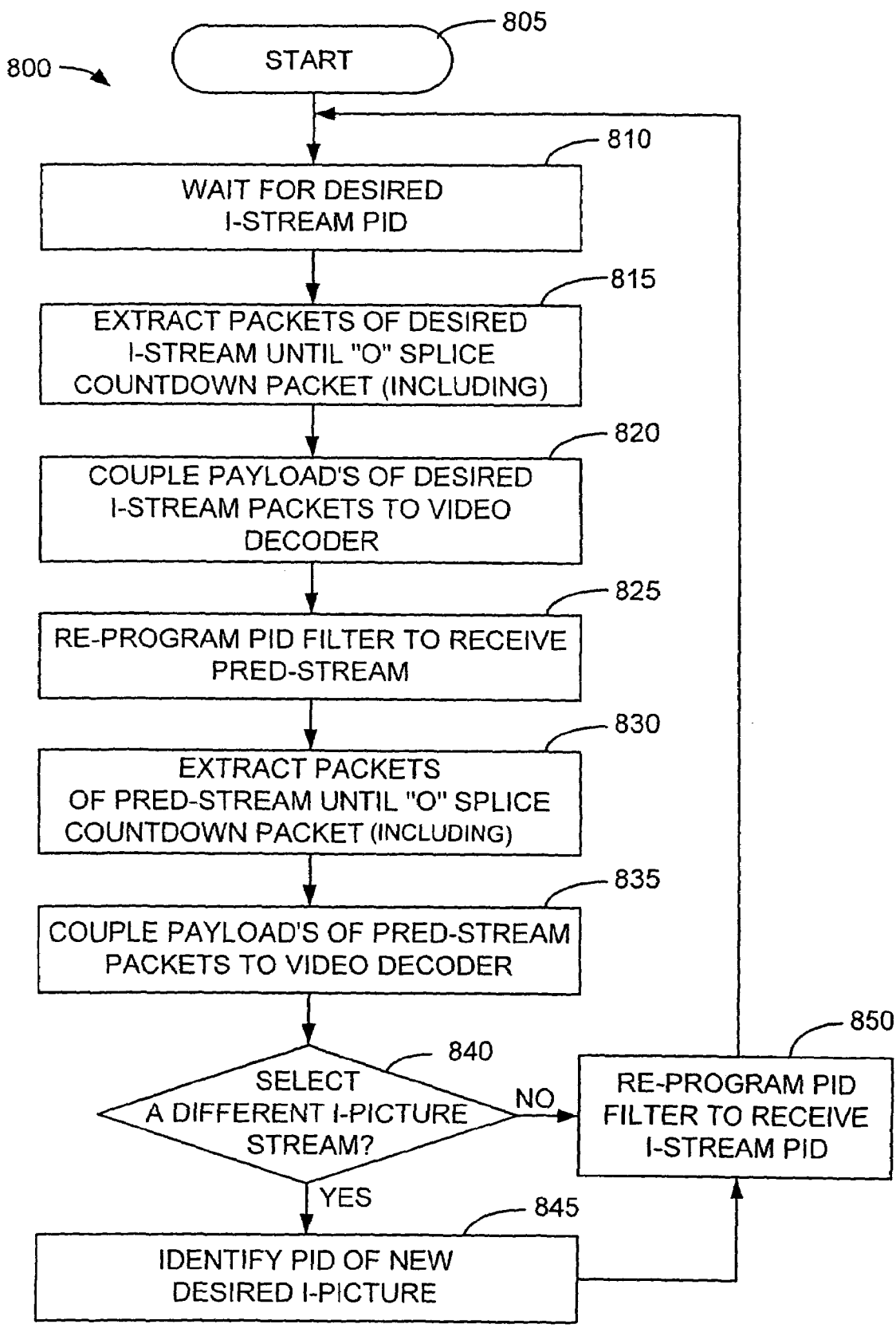
FIG. 8 depicts a flow diagram of a third method for recombining and decoding streams.

FIG. 8 illustrates the details of this method, in which, it starts at step 805 and proceeds to step 810 to wait for (user) selection of an I-PID to be received. The I-PID, as the first picture of a stream's GOP, represents the stream to be received. Upon detecting a transport packet having the selected I-PID, the method 800 proceeds to step 815.

At step 815, the I-PID packets are extracted from the transport stream until, and including, the I-PID packet with slice countdown value of zero. The method 800 then proceeds to step 820 where the payloads of the packets that includes header information related to video stream and I-picture data are coupled to the video decoder 550 as video information stream V. The method 800 then proceeds to step 825.

At step 825, the PID filter is re-programmed to receive the predicted picture packets PRED-PID. The method 800 then proceeds to 830. At step 830, the predicted stream packets, illustratively the PID-1 packets of fourteen predicted pictures 413 to 425 in FIG. 4 in a GOP of size fifteen, are extracted from the transport stream. At step 835, the payloads of the packets that includes header information related to video stream and predicted-picture data are coupled to the video decoder 550 as video information stream V. At the end of step 835, a complete GOP, including the I-picture and the predicted-pictures, are available to the video decoder 550. As the payloads are sent to the decoder in exactly in the order in which the packets arrive at the demultiplexer, the video decoder decodes the recombined stream with no additional recombination process. The method 800 then proceeds to step 840.

At step 840, a query is made as to whether a different I-PID is requested. If the query at step 840 is answered negatively, then the method 800 proceeds to step 850 where the PID filter is re-programmed to receive the previous desired I-PID. If answered affirmatively, then the PID of the new desired I-picture is identified at step 845 and the method proceeds to step 850, where the PID filter is re-programmed to receive the new desired I-PID. The method then proceeds to step 845, where the transport demultiplexer 530 waits for the next packets having the PID of the desired I-picture.

The method 800 of FIG. 8 is used to produce a conformant MPEG video stream V, where the PID to PID switch is performed based on a slice countdown concept.

D. Example: Interactive Program Guide

D1. User Interface and Operation of IPG

Figure 9:
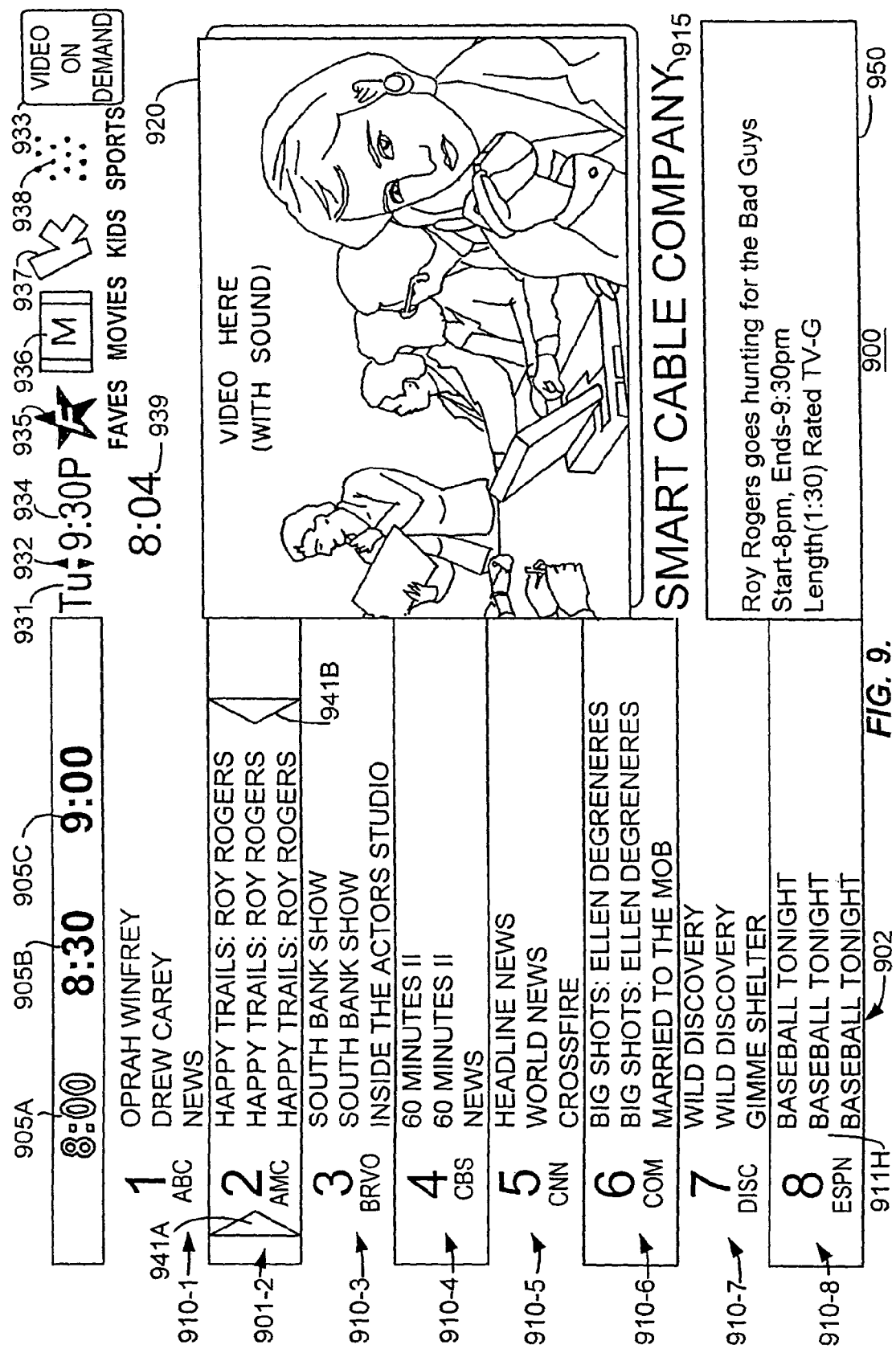
FIG. 9 depicts an example of one frame taken from a video sequence that can be encoded using the present invention.
Figure 10:
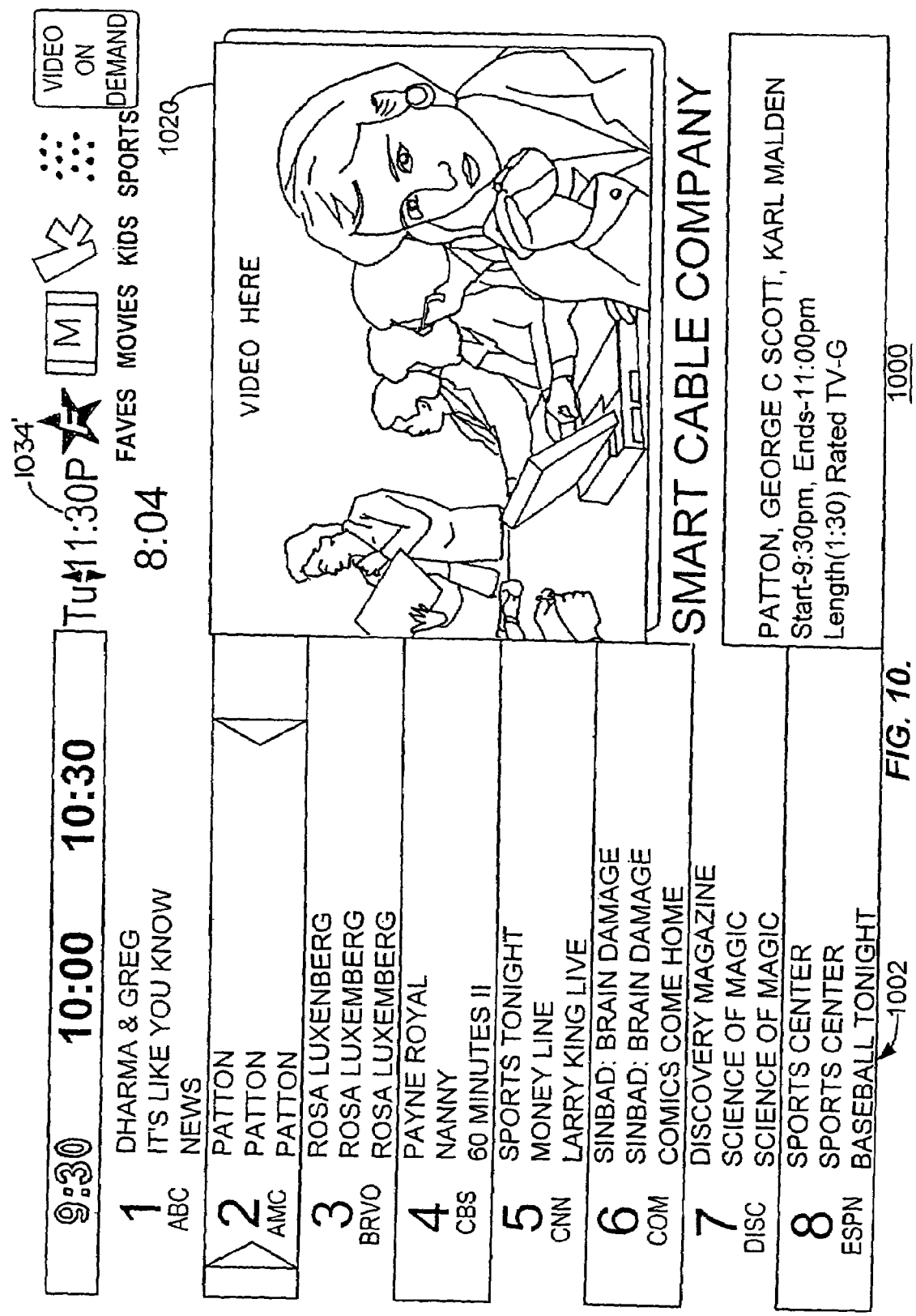
FIG. 10 depicts a second example of one frame taken from another video sequence that can be encoded using the present invention.

To illustrate the applicability of the invention to encoding IPG sequences, FIGS. 9 and 10 depict a frame from two different sequences of IPG pages 900 and 1000. The common information is everything except the programming grid 902 and 1002. The non-common information is the programming grid 902 and 1002. The programming grid 902 and 1002 changes from sequence 900 to sequence 1000. This grid changes for each channel group and each time interval. The IPG display 900 of FIG. 9 comprises a first 905A, second 905B and third 905C time slot objects, a plurality of channel content objects 910-1 through 910-8, a pair of channel indicator icons 941A, 941B, a video barker 920 (and associated audio barker), a cable system or provider logo 915, a program description region 950, a day of the week identification object 931, a time of day object 939, a next time slot icon 934, a temporal increment/decrement object 932, a "favorites" filter object 935, a "movies" filter object 936, a "kids" (i.e., juvenile) programming filter icon 937, a "sports" programming filter object 938 and a VOD programming icon 933. It should be noted that the day of the week object 931 and next time slot icon 934 may comprise independent objects (as depicted in FIG. 9) or may be considered together as parts of a combined object. Details regarding the operation of the IPG pages, their interaction with one another and with a user are described in commonly assigned U.S. patent application Ser. No. 09/359, 560, filed Jul. 22, 1999 which is hereby incorporated herein by reference.

In a system, illustratively, comprising 80 channels of information, the channels are displayed in 8-channel groups having associated with them three hour time slots. In this organization, it is necessary to provide 10 video PIDs to carry the present-time channel/time/title Information, one audio PID to carry the audio barker and/or a data PID (or other data transport method) to carry the program description data, overlay data and the like. To broadcast program information up to 24 hours in advance, it is necessary to provide 128 (8*24/1.5) video PIDS, along with one audio and, optionally, one or more data PIDs. The amount of time provided for in broadcast video PIDs for the given channel groups comprises the time depth of the program guide, while the number of channels available through the guide (compared to the number of channels in the system) provides the channel depth of the program guide. In a system providing only half of the available channels via broadcast video PIDs, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours.

The video streams representing the IPG are carried in a single transport stream or multiple transport streams, within the form of a single or multi-programs as discussed previously in this invention. A user desiring to view the next 1.5 hour time interval (e.g., 9:30-11:00) may activate a "scroll right" object (or move the joystick to the right when a program within program grid 902 occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

It is important to note that each extracted video stream is generally associated with a common audio stream. Thus, the video/audio barker function of the program guide is continuously provided, regardless of the selected video stream. Also note that the teachings of the invention is equally applicable to systems and user interfaces that employs multiple audio streams.

Similarly, a user interaction resulting in a prior time interval or a different set of channels results in the retrieval and presentation of a related video stream. If the related video stream is not part of the broadcast video streams, then a pointcast session is initiated. For this purpose, the STT sends a request to the head end via the back channel requesting a particular stream. The head end then processes the request, retrieves the related stream from the information server, incorporates the stream within a transport stream as a video PID (preferably, the transport stream currently being tuned/ selected by the STT) and informs the STT which PID should be received, and from which transport stream it should be demultiplexed. The STT then retrieves the related video PID. In the case of the video PID being within a different transport stream, the STT first demultiplexes the corresponding transport stream (possibly tuning a different QAM stream within the forward channel).

Upon completion of the viewing of the desired stream, the STT indicates to the head end that it no longer needs the stream, whereupon the head end tears down the pointcast session. The viewer is then returned to the broadcast stream from which the pointcast session was launched.

D.2 Compressing Exemplary IPG Pages

Figure 11:
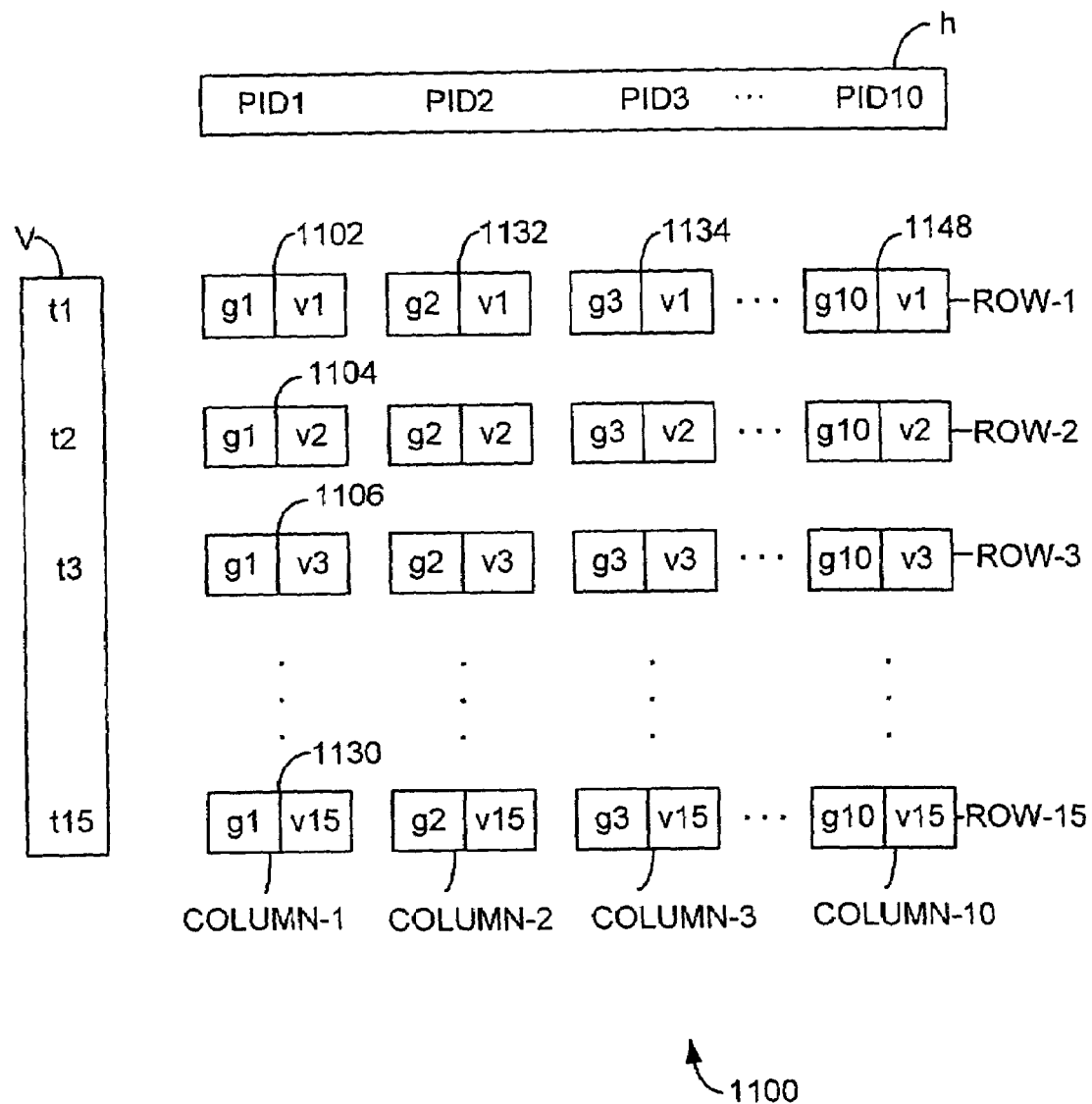
FIG. 11 depicts a matrix representation of program guide data.

FIG. 11 illustrates the ten IPG user interface page streams in a matrix representation 1100. The horizontal axis, h, in the figure represents the PID dimension consisting of 10 PID's, which corresponds to E1-E10 outputs of the real time encoders RTE1 to RTE10 of FIG. 2.

The vertical axis, v, in FIG. 11 represents the time domain, where for illustrative purposes, only 15 time units, t1 to t15, are included that forms a GOP for each stream identified by a PID in horizontal domain, h.

The matrix entries 1102 to 1130 in column-1 describes fifteen pictures of the first IPG page, PID-1. The guide portion, marked as g1, at each time unit, t1 to t15, does not change within a GOP of PID1. The same principle applies to PID-2 to PID-10 streams in columns-2 to 10, where guide portions, g2 to g10, at each time unit t1 to t15, does not change. On the other hand, each stream in column-1 to column-10 shares the same motion video portion, marked as v1 to v15.

Conversely, the guide region g changes from g1 to g10 in horizontal dimension. For example, in row-1, the pictures 1102 to 1148 contains different guide portions g1 to g10, although each has the same motion video picture v1, as the matrix is traversed in horizontal dimension. The same principle applies to row-2 to row-15, where guide portion g changes from g2 to g10, each stream in column-1 to column-10 sharing the same motion video picture, v2 to v15.

Figure 12:
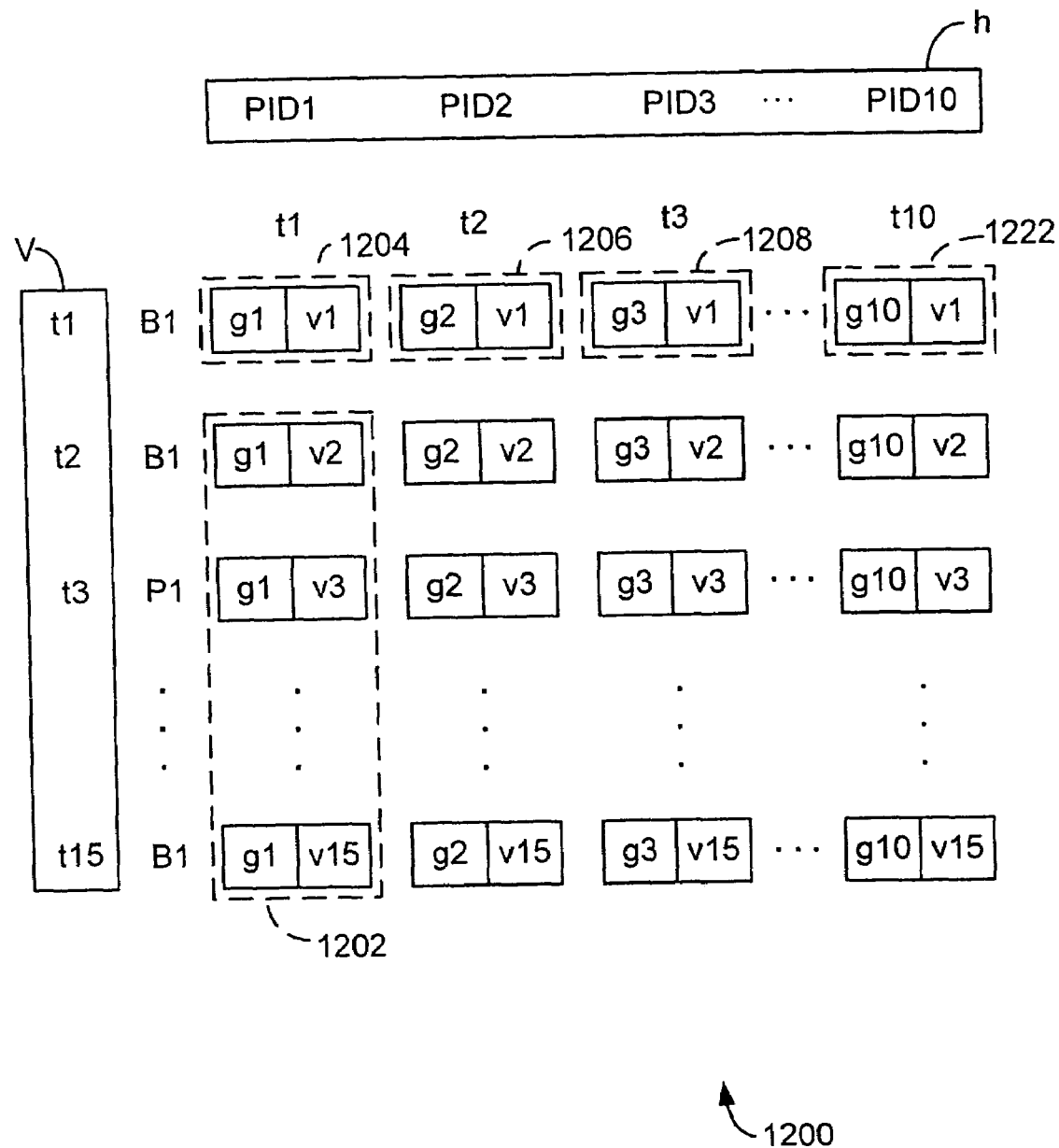
FIG. 12 depicts a matrix representation of program guide data with the data groupings shown for efficient encoding in accordance with the present invention.

FIG. 12 graphically illustrates an efficient compression algorithm 1200 that substantially minimizes the number of pictures that represents the information in FIG. 11. The same matrix representation as FIG. 11 is used, where the horizontal axis, h, represents the PID dimension consisting of 10 PID's, and the vertical axis, v, represents the time domain.

The element groupings, which are marked with dash-lines, 1202 to 1222 shows the data that can efficiently represent the complete matrix entries. In other words, using only the elements 1202 to 1222, it is possible to reconstruct all other elements in each row and column of the matrix.

A first element grouping 1202 includes all of the elements of the first column (PID-1) excluding the element in first row, 1204. The next group of elements in row-1, 1204 to 1222, illustrates the next group of elements required to represent the complete program guide elements of FIG. 11. Thus, rather than storing or transmitting 150 elements (i.e., all the elements of each row and column), the invention reconstructs the same amount of information using only 24 elements.

Specifically, the group of fourteen elements 1202 corresponds to the predicted picture stream that represents the common information. Each of the elements 1204 to 1222 is an intra-coded I-picture that represents the non-common information among 10 PID's. While each sequence, PID-1 to PID-10, is encoded in vertical dimension, e.g., for PID-1 producing I1 B1 B1 P1 . . . B1 B1, it can be observed that the prediction error images at each time unit, t2 to t15, does not change from PID to PID in horizontal dimension. Therefore, the grouping 1202 of PID-1 also includes the same information as the corresponding pictures of PID-2 to PID-10 at the same time units t2 to t15.

When a viewer wants to view a group of channels, the de-multiplexer at the STT selects the related I-PID stream and combines the selected I-PID and with the predicted-PID stream as previously discussed in the invention to produce a recombined stream, which is then uncompressed by the video decoder.

The described invention dramatically increases the amount of IPG information that can be transmitted to a subscriber. For example, if a 64 quadrature amplitude modulator (QAM) with 27 Mbps is used, then the bandwidth savings can be exemplified as follows: assuming 1 Mbps is reserved for audio, data, and overhead information, there remains 26 Mbps to encode the video streams. Assuming a relatively high level of video quality, each video stream to be encoded is allocated 2 Mbps of bandwidth, thereby resulting in a capability of 13 video streams per transport stream (s).

Alternatively, if the recombination method is employed, a GOP (consisting of fifteen pictures) which requires 2 Mbps is transmitted only once and the remaining 24 Mbps is allocated to 60 I-pictures, assuming that an I-picture occupies approximately 20 percent bitrate of a sequence (yielding 400 Kbps I-pictures in a 2 Mbps video sequence). Therefore, the present invention supports carrying 61 video streams each having a different IPG program page, within a 27 Mbps transport stream, versus 13 video streams in a regular encoding implementation not benefiting from the invention.

The index matrix representation described above with respect to FIGS. 11 and 12 may be used to represent program guide data with different contexts such broadcast, narrowcast, pointcast, shared pointcast, and the like.

Although various embodiments which incorporate the teachings of the present invention have been shown and described in detail herein, those skilled in the art can readily devise many other varied embodiments that still incorporate these teachings.

What is claimed is:

1. A method of stream recombining and decoding comprising the steps of:

extracting a first plurality of packets containing reference pictures from a transport stream;

extracting a second plurality of packets containing predicted pictures from said transport stream;

concatenating payloads from said first plurality of packets and payloads from said second plurality of packets;

decoding the concatenated payloads to produce a video sequence;

conducting a query if said reference picture is desired and identifying a new packet identifier if a new reference picture is desired.

2. The method of claim 1 wherein said concatenating step comprises coupling said reference pictures and said predicted pictures to the decoder in exactly the order in which said packets arrive at a demultiplexer.

3. The method of claim 1 being conducted within a demultiplexer.

4. The method of claim 1 wherein said payloads of said first plurality of packets contain imagery information that changes across a plurality of interactive program guides and said payloads of said second plurality of packets contain common imagery information of a plurality of interactive program guide pages.

5. A method of stream recombining and decoding comprising the steps of:

re-mapping a packet identifier of a reference stream to a pre-defined packet identifier;

re-mapping a packet identifier of a predicted picture stream to said pre-defined packet identifier;

extracting from a transport stream the packets of the stream having said pre-defined packet identifier;

coupling the payloads of transport packets of said transport stream to a video decoder;

decoding the payloads to produce a video sequence;

conducting a query if a reference picture is desired and identifying a new packet identifier if a new reference picture is desired.

6. The method of claim 5 wherein payloads of said reference stream contain imagery information that changes across a plurality of interactive program guides and payloads of said predicted picture stream contain common imagery information of a plurality of interactive program guide pages.

7. A method of stream recombining and decoding comprising:

coupling each payload of transport packets of a reference stream to a video decoder, including a packet with a zero splice countdown value;

coupling each payload of transport packets of a predicted picture stream to a video decoder upon receiving a reference stream packet with a zero splice countdown value;

decoding the payloads to produce a video sequence;

conducting a query if a reference picture is desired and identifying a new packet identifier if a new reference picture is desired.

8. The method of claim 7 wherein said payloads from said reference stream contain imagery information that changes across a plurality of interactive program guides and said payloads from said predicted picture stream contain common imagery information of a plurality of interactive program guide pages.

9. The method of claim 7 wherein said coupling step further comprises the step of reprogramming a packet identifier filter to receive said packets having said new packet identifier.

10. The method of claim 7 wherein said coupling step comprises the step of coupling said payloads from said reference stream and said payloads from said predicted stream to the decoder in exactly the order in which said packets arrive at a demultiplexer.

* * * * *

UNITED STATES PATENT AND TRADEMARK OFFICE
CERTIFICATE OF CORRECTION

PATENT NO.        : 7,505,519 B2                                          Page 1 of 1
APPLICATION NO.   : 10/655410
DATED             : March 17, 2009
INVENTOR(S)       : Donald F. Gordon et al.

It is certified that error appears in the above-identified patent and that said Letters Patent is hereby corrected as shown below:

On the Title Page, item (75), under Inventors:
Please delete "Jeremy S. Edmonds, Sunnyvale, CA" and insert -- Jeremy S. Edmonds, Castro Valley, CA --

On Title Page Two, First Column, item (56), under U.S. PATENT DOCUMENTS:
Please delete the duplicative reference
"4,706,121  A  11/1987  Young...................358/142"

Signed and Sealed this
Fourteenth Day of October, 2014

Michelle K. Lee
*Deputy Director of the United States Patent and Trademark Office*